(12) United States Patent
Wang et al.

(10) Patent No.: US 7,479,902 B2
(45) Date of Patent: *Jan. 20, 2009

(54) UNIVERSAL MOBILE KEYBOARD

(75) Inventors: Lichen Wang, Watsonville, CA (US); Keming Yeh, Fremont, CA (US); Siew Ming Yong, Johor (MY)

(73) Assignee: ACTISYS Corporation, Fremont, CA (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/411,315

(22) Filed: Apr. 26, 2006

(65) Prior Publication Data

US 2006/0192689 A1 Aug. 31, 2006

Related U.S. Application Data

(60) Continuation of application No. 11/282,281, filed on Nov. 18, 2005, which is a division of application No. 10/277,462, filed on Oct. 21, 2002, now Pat. No. 6,999,008.

(51) Int. Cl.
*H03M 11/00* (2006.01)
(52) U.S. Cl. .......................................... 341/22; 345/169
(58) Field of Classification Search ............. 341/22, 341/176; 345/169, 905; 361/683, 680, 686; D14/317
See application file for complete search history.

(56) References Cited

U.S. PATENT DOCUMENTS

| 6,614,422 B1 | 9/2003 | Rafii et al. |
| 6,785,126 B2 | 8/2004 | Hazzard et al. |

*Primary Examiner*—Albert K Wong
*Assistant Examiner*—Hung Q Dang
(74) *Attorney, Agent, or Firm*—MacPherson Kwok Chen & Heid, LLP.; David S. Park

(57) ABSTRACT

A versatile and mobile keyboard and a highly energy efficient keyboard scanning method are provided. The keyboard may be used with a variety of mobile devices such as PDAs, cellular phones, and tablet PCs, through various interfaces such as an IR, USB, or Bluetooth™ interface. In particular, an IR head assembly is provided that includes an IR head, a movable arm on which the IR head is mounted, and a connector for attaching to a docking structure. The docking structure may be attached to a keypad, which is electrically coupled to the IR head for transmitting keystroke data through the IR head. When a mobile device is docked on the docking structure, the arm in the IR assembly may be moved to an optimal distance from the IR port of the mobile device to ensure high communication performance between the keyboard and the mobile device. An energy efficient keyboard scanning method utilizes higher-valued pull-up resistors for energy conservation. The keyboard scanning method includes a charging step to charge stray capacitance associated with the keys. The keyboard scanning method can also be operated at a variable scanning frequency.

25 Claims, 17 Drawing Sheets

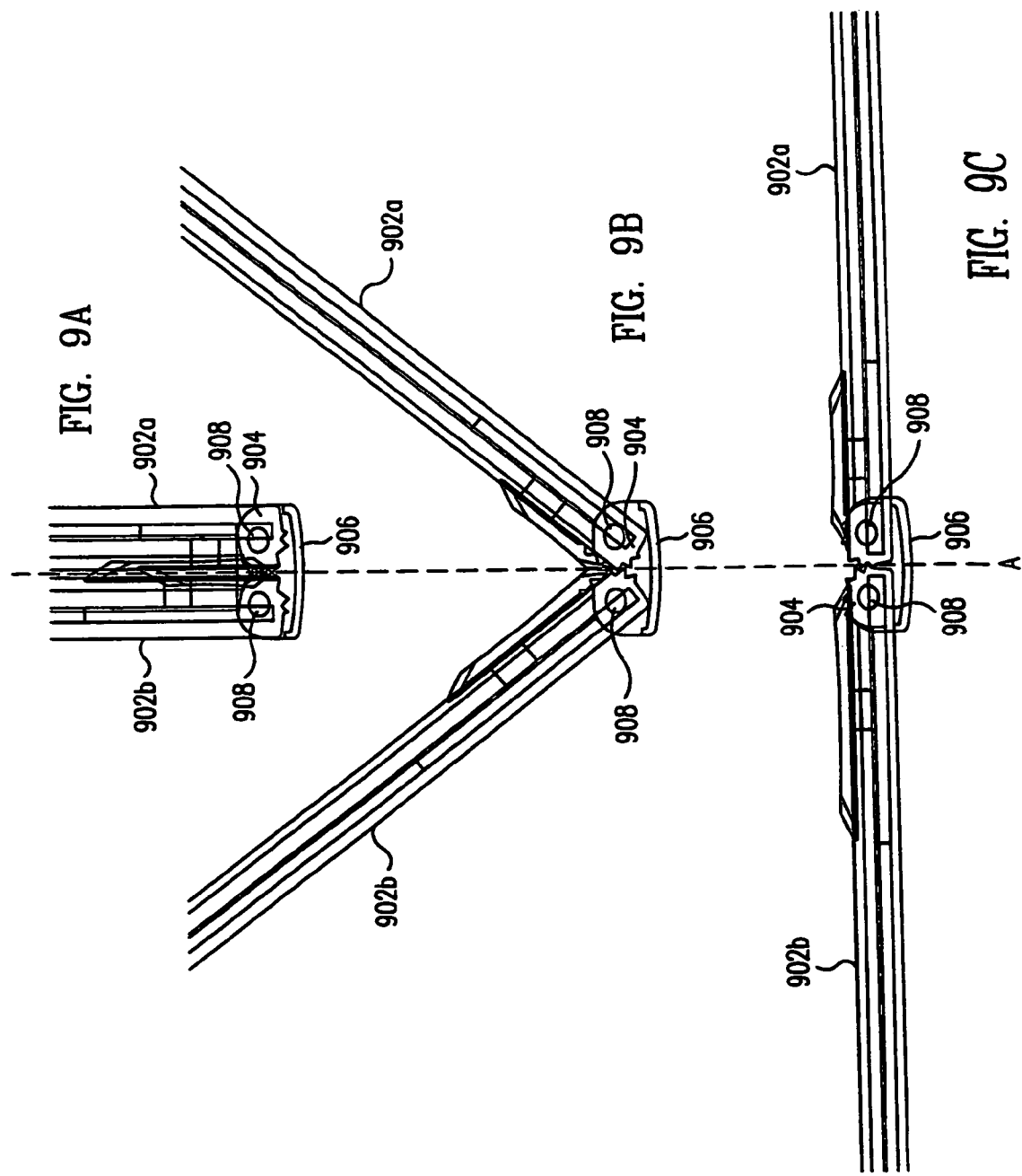

Axle Center

UNIVERSAL MOBILE KEYBOARD

REFERENCE TO RELATED APPLICATIONS

This application is a continuation of U.S. application Ser. No. 11/282,281 filed Nov. 18, 2005, which is a divisional of U.S. application Ser. No. 10/277,462 filed Oct. 21, 2002, now U.S. Pat. No. 6,999,008, the contents of which are incorporated by reference herein for all purposes.

BACKGROUND OF THE INVENTION

1. Field of Invention

The present invention generally relates to keyboards for mobile devices. More particularly, the present invention relates to a universal mobile keyboard including an infrared interface and an energy-efficient keyboard scanning method.

2. Discussion of the Related Art

Personal digital assistants (PDAs) have become more popular and affordable with improved technology, allowing for enhanced display quality, color richness, contrast, processing speed, power efficiency, memory capacity, RF communication capability, and other desirable characteristics. Similar advances have also been made in other mobile devices, such as cellular phones, smart phones (PDA plus cellular handset), industrial data terminals, and tablet PCs. Thus, there is a growing need for an efficient and convenient universal device and method for data entry and for providing a user interface with these mobile devices.

Some mobile devices offer touch-sensitive LCD screens with built-in recognition software for data input by handwriting or "graffiti." However, data input using graffiti is not convenient or efficient unless the user is properly trained in the method. Even then, data input using graffiti is not usually as fast as using a keyboard.

Some PDAs have built-in soft or virtual keyboards, or other input means, such as thumb-boards, silk-screen keyboards, and rubber keyboards. However, these input means are less efficient than small foldable keyboards that connect to the mobile device, such as a PDA, and offer the familiar desktop/notebook keyboard input style.

Such small foldable keyboards typically require a connector customized for each mobile device make or model. Usually a device-specific connector is used for both data exchange and for holding the mobile device in place. Such a connector often lacks stability. Also, when a user gets a new mobile device, the user would also need to purchase a new keyboard. Some keyboards provide changeable connector heads. However, these changeable connector heads achieve only limited flexibility, given the many connector types that are used among mobile devices.

Accordingly, wireless keyboards (e.g., infrared-based keyboards) are desired. However, typical infrared (IR)-based keyboards in the prior art suffer from several disadvantages. For example, a typical prior art IR keyboard uses a polished metal reflector to guide the IR beam from the keyboard to the IR port of a mobile device, which can be found at the top or at the side of the mobile device. Such a polished metal reflector is awkward to adjust and difficult to keep steady. Furthermore, to achieve the IR beam reflection, a stronger IR beam intensity than otherwise needed for data transmission is used. Thus, battery energy is inefficiently used, resulting in a shorter battery life or requiring a larger number of batteries (e.g., from 1 to 3 AAA batteries) or a higher battery capacity. In addition, a stronger than required IR beam intensity may also in some instances overwhelm or "blind" the IR receiver circuitry in a mobile device IR port, causing data error or a sluggish response. A reflector-based IR beam guidance scheme has limited flexibility in aligning to IR ports, as the IR port may be found in any of a variety of possible locations on a mobile device.

Therefore, what is needed is a keyboard for a mobile device that is operable with a large number of mobile devices. In particular, a keyboard with an IR interface is needed that is operable with and adjustable for a variety of possible IR port locations found on various mobile devices. Additionally, a keyboard scanning method is needed that is highly energy efficient to increase battery life and improve keyboard portability.

SUMMARY

The present invention provides a universal keyboard that includes multiple interfaces for operability with a variety of mobile devices, such as PDAs, smart telephones, and cellular telephones. Furthermore, a highly energy-efficient method for scanning a keyboard is provided.

According to one embodiment of the present invention, a universal keyboard includes an IR head capable of transmitting data, an arm operably coupled to the IR head, a docking structure, a connector operably coupled to a base of the arm and the docking structure to allow the arm movement within a plane, and a keyboard device operably coupled to the docking structure and the IR head, such that data entered on the keyboard can be transmitted by the IR head to a mobile device placed on the docking structure.

According to another embodiment of the present invention, a universal keyboard selectably operates an IR interface, a USB interface, or a Bluetooth™ interface to transmit data input on the keyboard over the selected IR interface, the USB interface, or the Bluetooth™ interface.

According to another embodiment of the present invention, a method for a low-power operation of a keyboard provides a micro-controller having output pins and input pins, wherein each key of the universal keyboard is coupled to both a designated output pin and a designated input pin, providing each input pin a pull-up resistor operably coupled to a voltage source. The pull-up resistor has a value between about 1 mega-ohm and about 100 mega-ohms to decrease power consumption. To operate this universal keyboard, a selected output pin is placed at a first voltage level, for example ground voltage level, and each input pin is then sensed to determine if a selected one of the keys associated with the selected output pin and one of the input pins is depressed. If the key is depressed, the output pin corresponding to the selected key is driven to a second voltage level, for example power source voltage level, to recharge the stray capacitance associated with the output pin and the selected input pin. After recharging, the output pin is put in high-impedance state and depends on the pull-up resister to maintain the voltage level.

The present invention allows for great flexibility in transmitting data to an IR port located at any of many positions on a mobile device while also providing a highly energy efficient keyboard scanning method.

According to another aspect of the present invention, a method is provided whereby the software driver for operating the keyboard is downloaded from a storage medium in the keyboard to a mobile device, according to the make and model of the program device, without having to place the mobile device in a cradle or a docking device attached to a desktop computer or a notebook computer.

These and other features and advantages of the present invention will be more readily apparent from the detailed description of the embodiments set forth below taken in conjunction with the accompanying drawings.

BRIEF DESCRIPTION OF DRAWINGS

FIGS. 9A-9C show a central hinge of a universal keyboard in accordance with an embodiment of the present invention.

Use of the same reference symbols in different figures indicates similar or identical items. It is further noted that the drawings may not be drawn to scale.

DETAILED DESCRIPTION

Figure 1A:
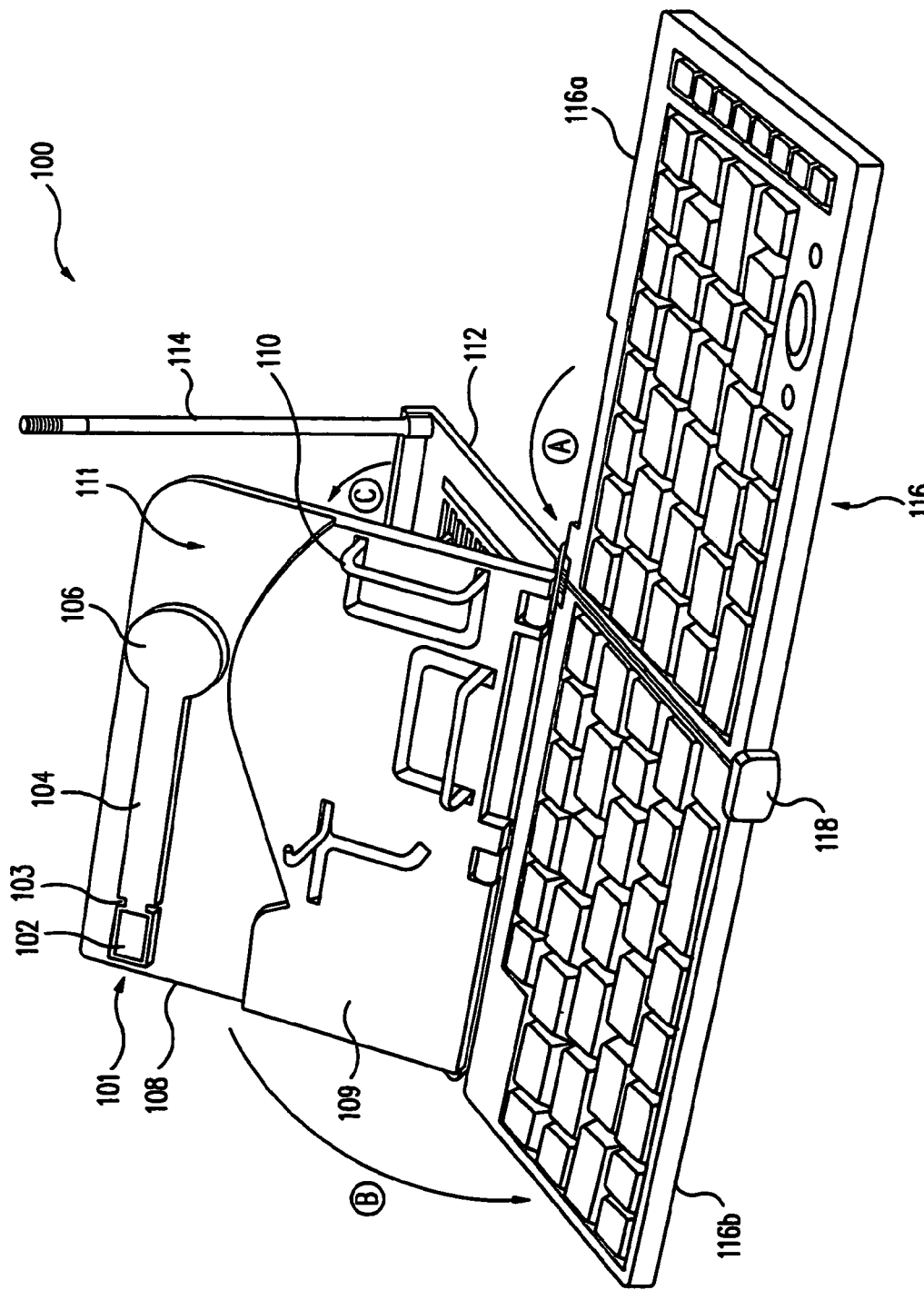
FIGS. 1A-1D show different views of an unfolded universal keyboard in accordance with an embodiment of the present invention.

The present invention provides a universal keyboard that can be used with any of a variety of mobile devices, such as PDAs, cellular/smart phones, and tablet PCs. The present invention also provides a universal and highly energy efficient keyboard.

FIGS. 1A-1D illustrate an unfolded universal keyboard 100, in accordance with one embodiment of the present invention. As shown in FIGS. 1A-1D, an infra-red (IR) head assembly 101 is mounted on a docking structure 108, which is attached to keypad 116. Top cover 112 may also optionally be included with universal keyboard 100.

In one embodiment, IR head assembly 101 includes IR head 102, which is mounted on an arm 104 that is rotatable about an axis perpendicular to a plane of docking structure 108, and connector 106. IR head 102 includes an IR light emitting diode (LED). In one embodiment, the LED is biased to conduct an electrical current that provides an IR beam intensity calculated to achieve a high IR signal-to-noise ratio and a small IR data error rate, based upon an estimation of the minimum and maximum distances between IR head 102 and an IR port of a mobile device that can be mounted on the docking structure 108. In one implementation, the minimum and maximum IR beam distances are determined to be about 0.3 cm and about 3 cm, respectively. In that implementation, using a commercially available IR LED Vishay TSMF1000, the electrical current supplied to the IR LED may range between about 2 mA to about 10 mA.

Figure 1B:
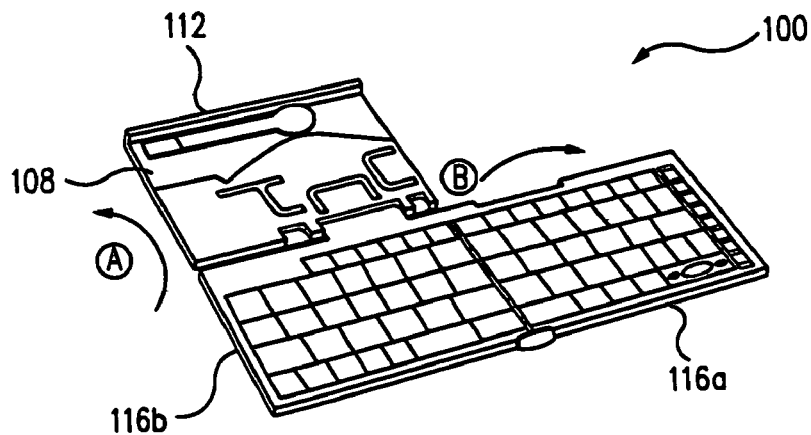
Figure 1C:
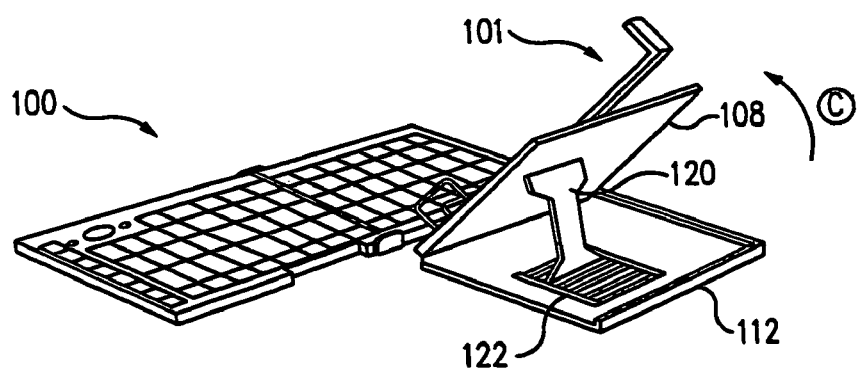
Figure 1D:
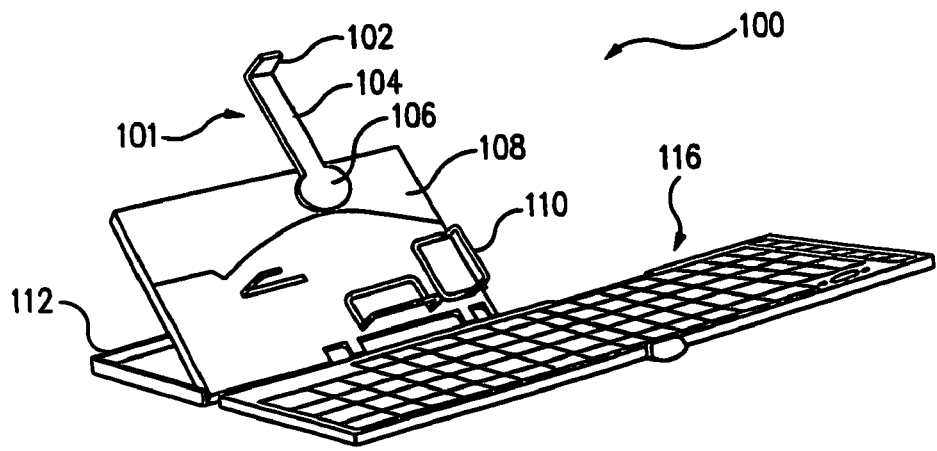

IR head 102 may be mounted on arm 104 by a hinge 103 or other suitable mechanism in order to enable IR head 102 to be positioned at any of a range of angles relative to arm 104 (FIGS. 1C and 1D). Arm 104 is mounted on docking structure 108 by connector 106 (e.g., a ball bearing) that allows arm 104 to rotate around an axis perpendicular to a plane of docking structure 108. The location of connector 106 and the length of arm 104 are selected to allow IR head 102 to be positioned for line-of-sight communication with an IR port of any of a large number of mobile devices that can be mounted on docking structure 108, regardless of their IR port locations. To ensure a consistent electrical current to IR head 102 regardless of the position of rotatable arm 104 and to maintain a relatively thin structure, a circular multi-hub copper contact structure is included in connector 106. In one example, arm 104 has a length of about 8 cm. In addition, in one implementation, one or more batteries that are housed in arm 104 power IR head 102.

Figure 2A:
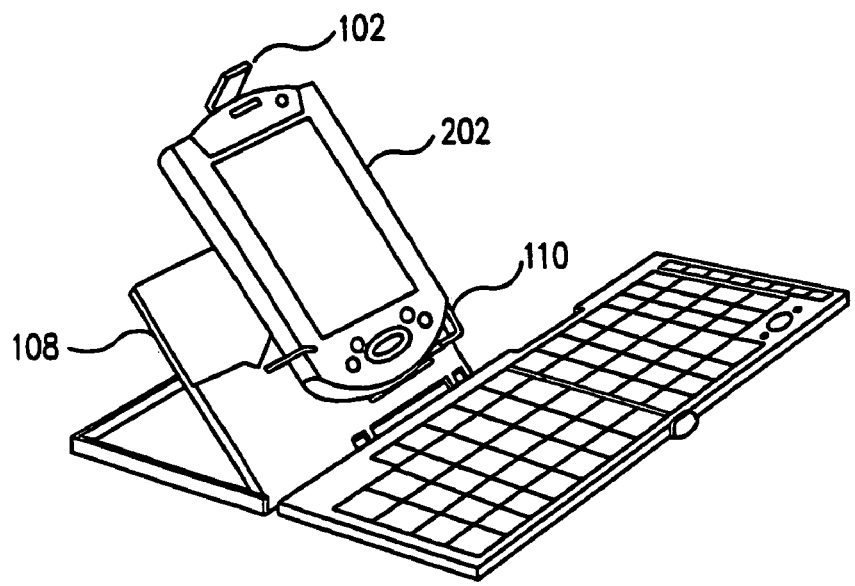
FIGS. 2A-2D show different views of an unfolded universal keyboard with an example of a docked PDA in accordance with an embodiment of the present invention.
Figure 2B:
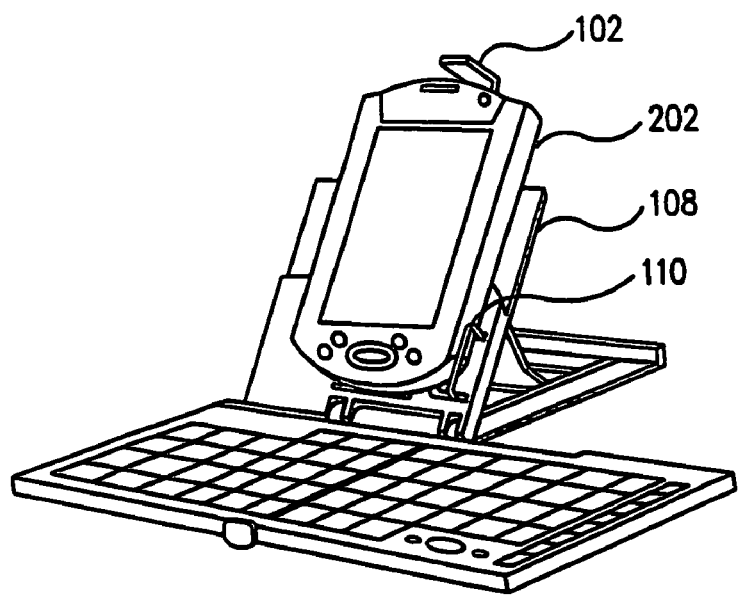
Figure 2C:
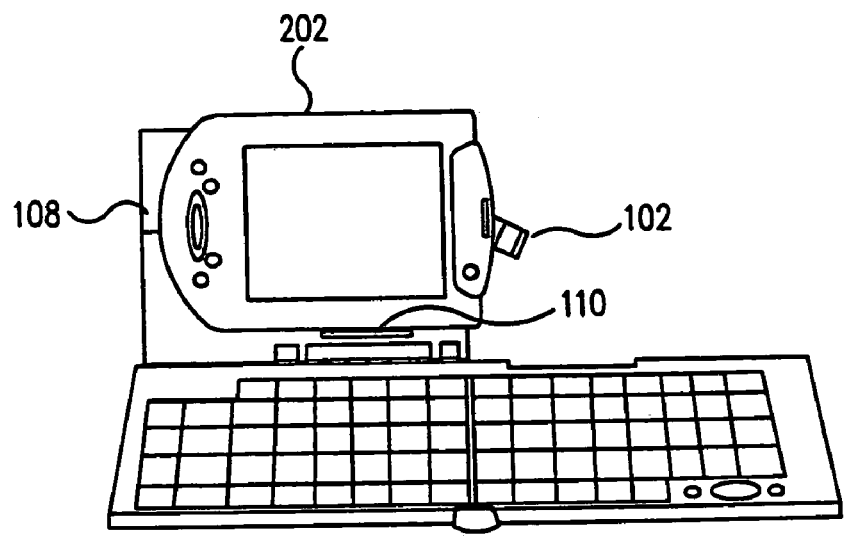
Figure 2D:
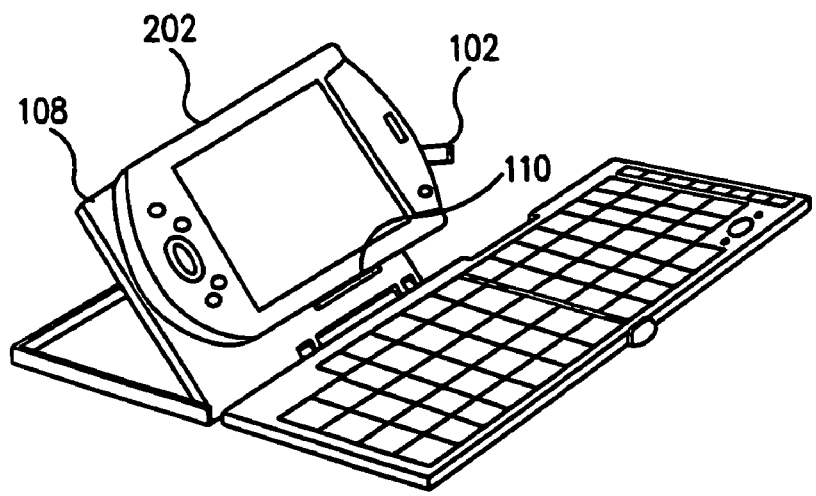
Figure 3:
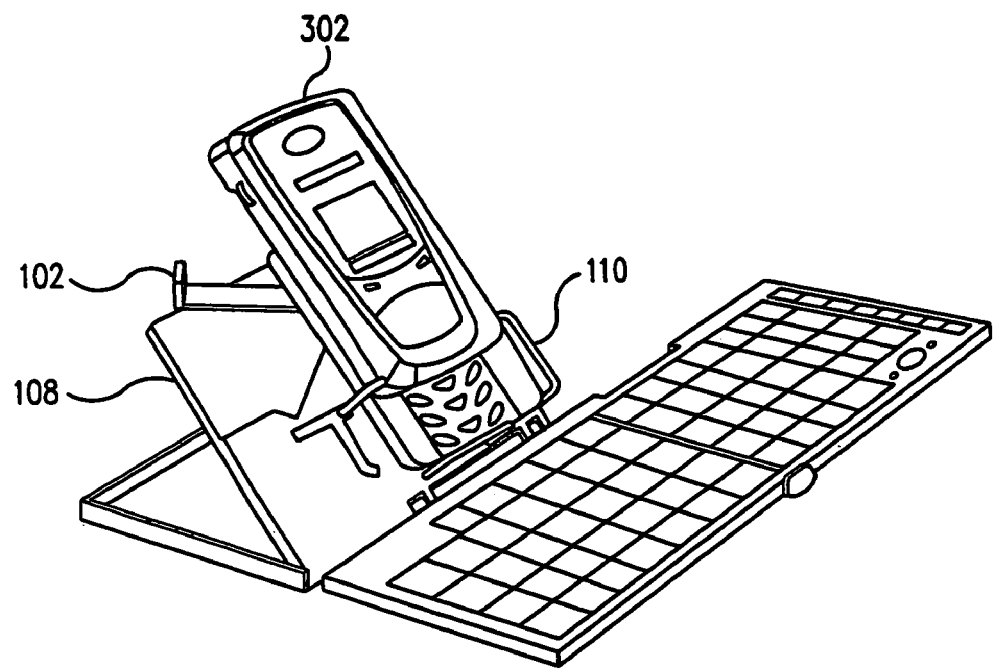
FIG. 3 shows an unfolded universal keyboard with an example of a docked cellular telephone in accordance with an embodiment of the present invention.
Figure 4:
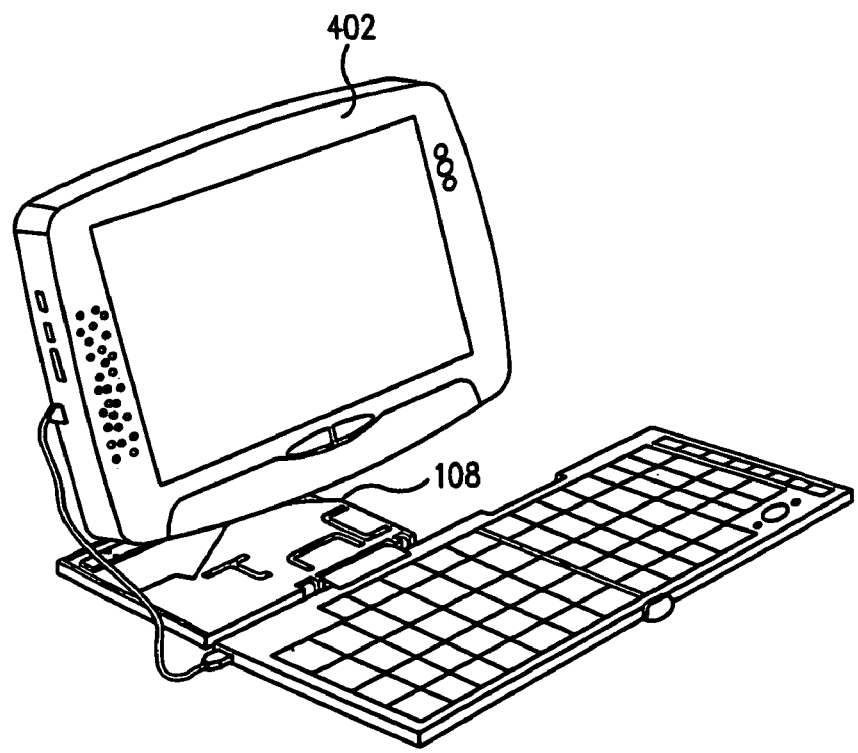
FIG. 4 shows an unfolded universal keyboard operably coupled to an example of a docked tablet PC in accordance with an embodiment of the present invention.

In one embodiment, docking structure 108 includes spring-loaded movable device holders 110 for securely holding in place a mobile device (e.g., a PDA, a smart phone, or a tablet PC) oriented in one of many possible orientations, such as shown in FIGS. 2A-2D, 3, and 4. FIGS. 2A-2B show a PDA 202 securely docked in a "portrait" position on docking structure 108 and FIGS. 2C-2D show a PDA 202 securely docked in a "landscape" position on docking structure 108. FIG. 3 shows a cellular phone 302 securely docked on docking structure 108 and FIG. 4 shows a tablet PC 402 securely docked on docking structure 108.

Figure 5A:
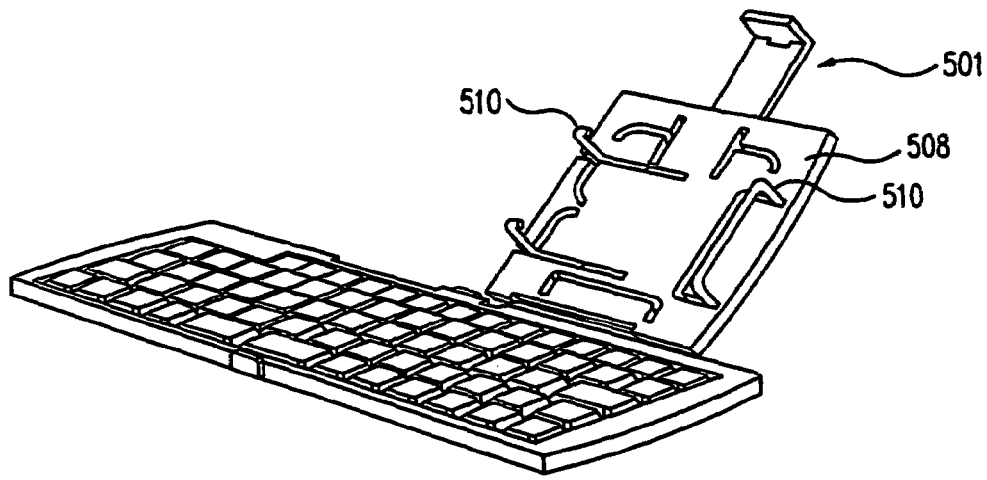
FIGS. 5A-5B show an unfolded universal keyboard in accordance with another embodiment of the present invention.
Figure 5B:
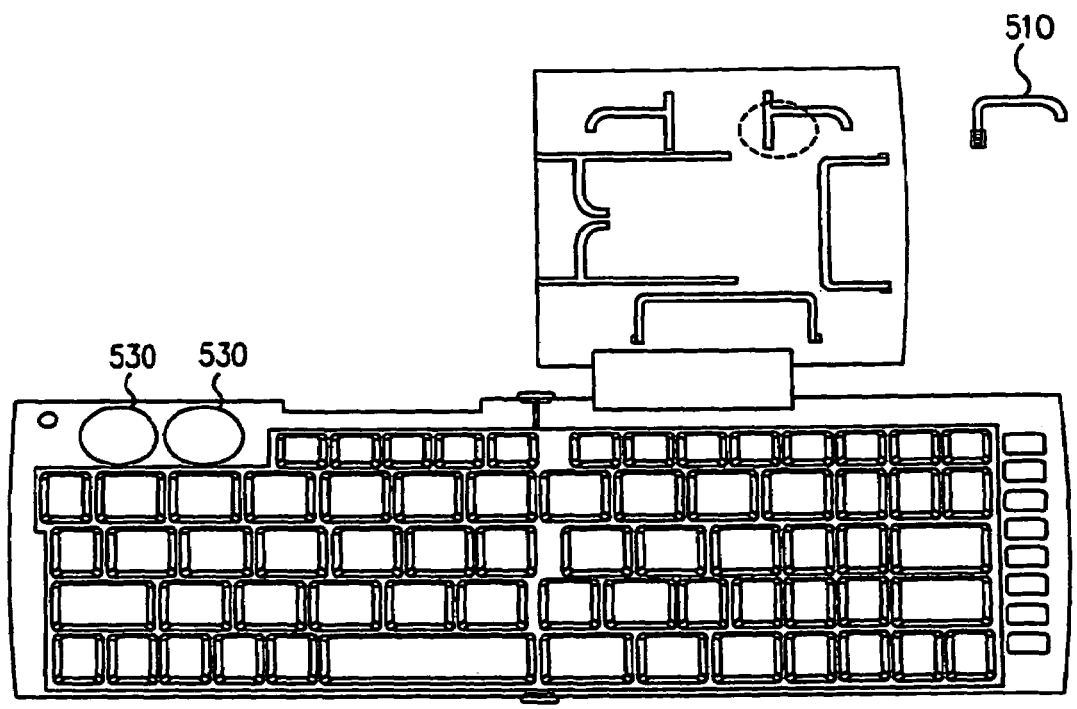

As noted above, a prior art connector-based keyboard uses the connector to hold the mobile device in place, often resulting in an unstable configuration. By contrast, holders 110 are designed and positioned to secure onto docking structure 108 any of a large number of mobile devices of various lengths, widths, and thicknesses. Grooves into which holders 110 may be folded or retracted are provided on one surface of docking structure 108 (FIG. 1B). Holders 110 are designed to be flush with the surface of docking structure 108, when folded or retracted into the grooves. Holders 110 need to be placed and/or shaped only as shown in FIGS. 1A-1D. Holders 110 may be placed in various positions and formed into various shapes with corresponding grooves to securely hold a mobile device. FIGS. 5A-5B illustrate examples of other spring-loaded holders 510 that may be used in accordance with the present invention.

In one embodiment as further shown in FIGS. 1A-1D, docking structure 108 includes a recessed area 111 on an inside surface of docking structure 108 at which connector 106 connects to IR head assembly 101. Recessed area 111 allows the arm structure of IR head assembly 101 to freely move through a large range of angles when a mobile device is docked, and provides the universal keyboard a thin profile when docking structure 108 is in the folded position for storage.

Alternatively, IR head assembly 101 may be mounted on an outer surface of docking structure 108 to enable more holders or holder structures to be provided on the inside surface of docking structure 108, such that a greater number of mobile devices of various shapes and sizes can be held by docking structure 108 in a variety of positions (e.g., in portrait or landscape positions).

Figure 6A:
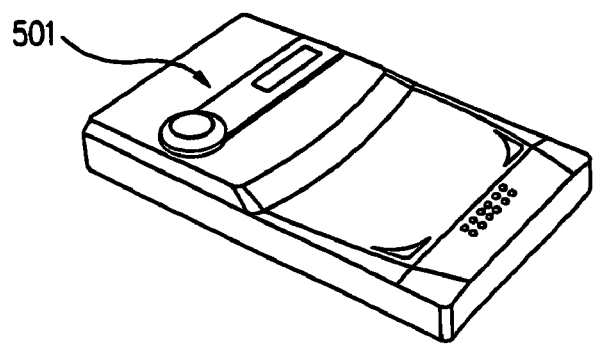
FIGS. 6A-6B show the outer surface of the folded universal keyboard of FIGS. 5A-5B in accordance with an embodiment of the present invention.
Figure 6B:
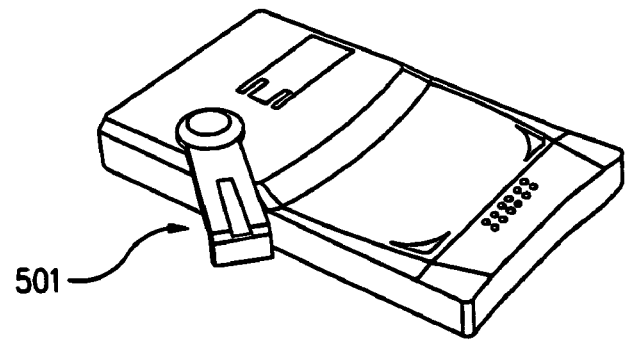

FIGS. 5A and 6A-6B show an IR head assembly 501 that is provided on an outer surface of docking structure 508, with a recessed area into which IR head assembly 501 can be secured when the IR keyboard 500 is in the folded, or storage position. In that configuration, the properly secured IR head assembly 501 is substantially flush with the outer surface of docking structure 508.

Figure 7A:
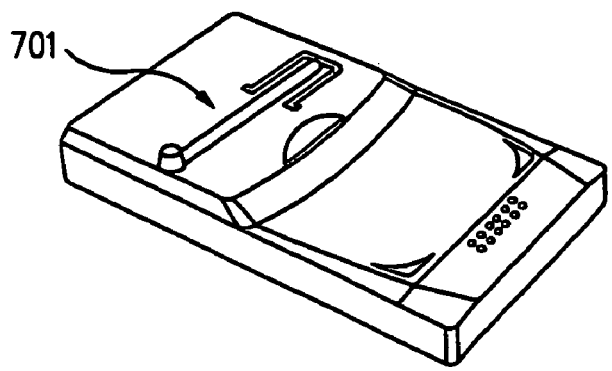
FIGS. 7A-7C show different views of the outer surface of a folded universal keyboard, IR head, arm, and connector in accordance with another embodiment of the present invention.
Figure 7B:
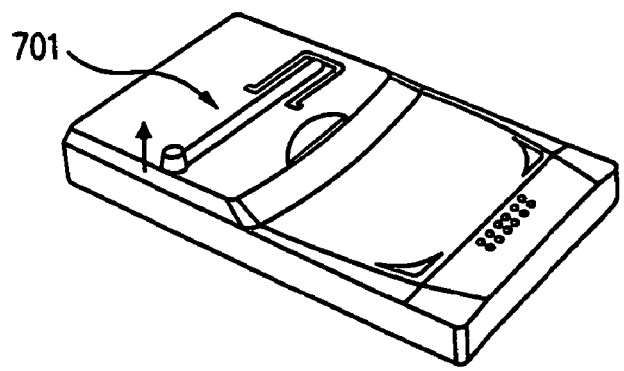
Figure 7C:
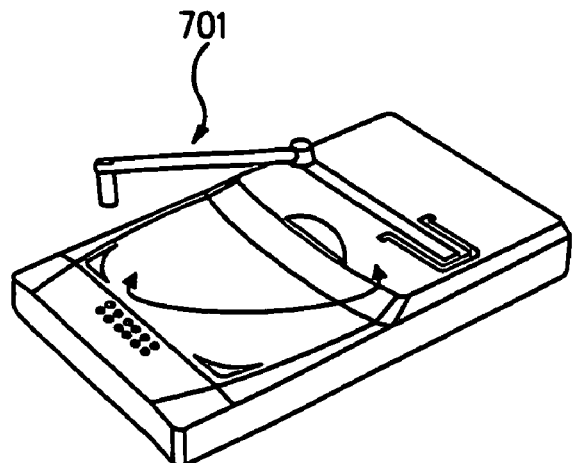

FIGS. 7A-7C show IR keyboard 700, according to another embodiment of the present invention, in which IR head assembly 701 is mounted by a spring-loaded mechanism to an outer surface of docking structure 708. IR head assembly 701 may be placed within a recessed area of the outer surface of docking structure 708 in the storage or folded position (FIG. 7A). IR head assembly 701 can be lifted up from the recessed area (FIG. 7B), and be allowed to move freely along a circular arc that is parallel to the surface of docking structure 708 (FIG. 7C) and centered about an axis perpendicular to docking structure 708.

Figure 6C:
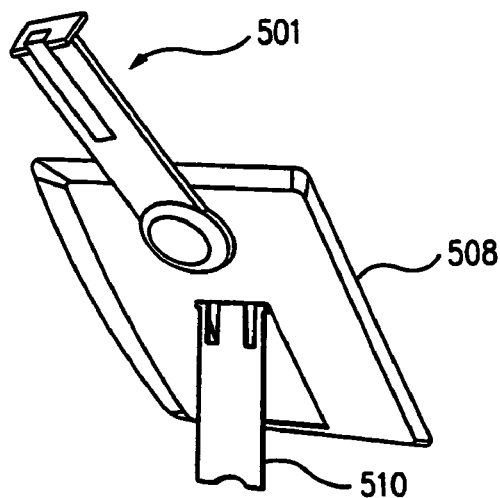
FIG. 6C shows a docking structure, IR head, arm structure, and connector of the universal keyboard of FIGS. 5A-5B in accordance with an embodiment of the present invention.

Referring back to FIG. 1C, docking structure 108 may also include stand 120 which is attached to the outer surface of docking structure 108. Stand 120 may be slotted into any one of several grooves 122 provided on the inner surface of top cover 112, such that docking structure 108 can be supported at various inclined angles relative to the surface of top cover 112. Alternatively, stand 120 may be made free-standing at one of various inclined angles on the flat surface on which IR keyboard 100 is unfolded. FIG. 6C shows IR keyboard 500 having stand 510 supporting an outer surface of docking structure 508 at various inclined angles relative to the surface on which keyboard 100 is placed. Alternatively, referring back to FIG. 1C, stand 120 may be attached to top cover 112 and may be coupled into any one of several grooves formed into an outer surface of docking structure 108.

Docking structure 108 may also include battery compartment 109 to hold one or more batteries used for providing power to IR head 102. Of course, battery compartment 109 need not be placed in docking structure 108 but may also be placed in keypad 116 instead. FIG. 5B shows batteries 530 being placed in battery compartment 109 provided at the upper left hand corner of keypad 116.

Figure 8:
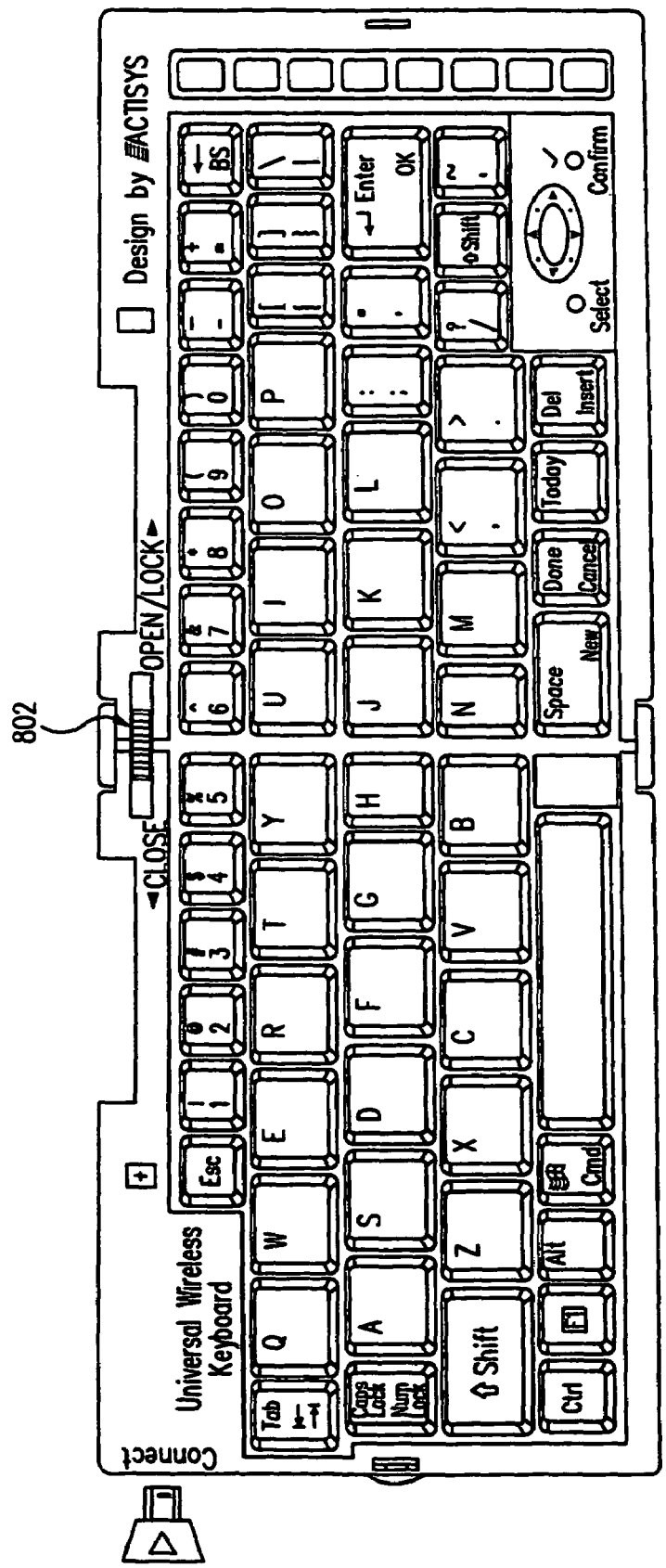
FIG. 8 shows an example of a foldable keyboard with a locking mechanism in accordance with an embodiment of the present invention.

As shown in FIGS. 1A-1D, in one embodiment, keypad 116 includes foldable sections 116a and 116b joined by a central hinge or coupler 118. Alternatively, as shown in FIG. 8, keypad 116 includes latch 802 that, when moved to an "open" position, locks keypad sections 116a and 116b in a spread-flat position to allow a steady surface to facilitate touch typing.

FIGS. 9A-9C and 10A-10B illustrate two central hinge mechanisms that can be used to couple two keypad sections and allow them to fold and unfold properly, in accordance with two embodiments of the present invention. According to one embodiment, shown in FIGS. 9A-9C, keypad section 902a and 902b each include plates 904 provided on opposite sides of the keypad section and connected by rod 908, thus forming a hinge about which plates 904 can rotate. Plates 904 of keypad sections 902a and 902b on each side of the keypad sections are connected by central face plate 906. Plates 904 are each provided teeth-like structures. Central face plate 906 keeps keypad sections 902a and 902b properly aligned by ensuring the teeth on plates 904 on keypad sections 902a and 902b properly mesh during folding or unfolding keypad 902. Central face plate 906 is kept centered at all times during folding or unfolding (i.e., does not slide to either side of center line A), thus allowing for precisely positioned opening and closing of keypad sections 902a and 902b. FIG. 9A shows a side view of a completely folded keyboard device. Keypad sections 902a and 902b are aligned such that plates 904 are properly meshed when folding or unfolding the keypad sections, as shown in FIG. 9B. FIG. 9C shows a completely unfolded keyboard device.

Figure 10A:
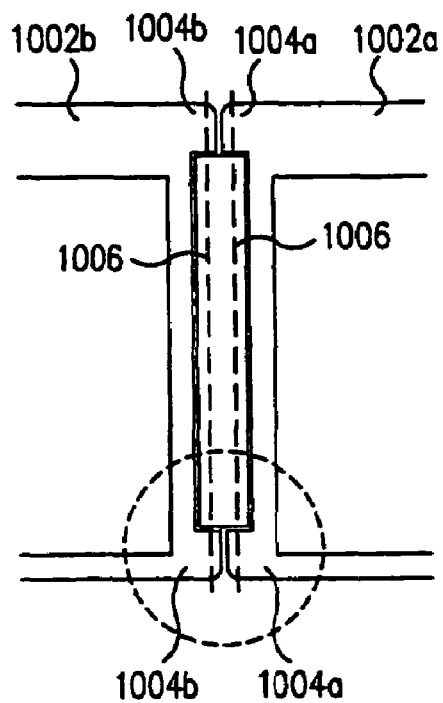
FIGS. 10A-10B show a central hinge of a universal keyboard in accordance with another embodiment of the present invention.
Figure 10B:
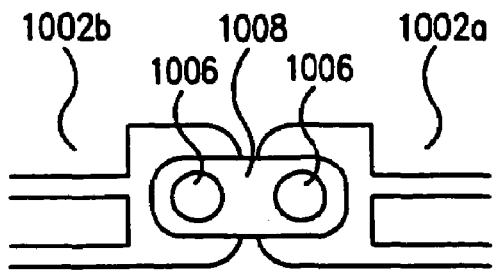

FIGS. 10A-10B illustrate another hinge mechanism that may be used in accordance with another embodiment of the present invention. FIG. 10A shows a top view of keypad sections 1002a and 1002b coupled by a hinge mechanism. Keypad sections 1002a and 1002b each include a pair of arms, designated 1004a for keypad section 1002a and designated 1004b for keypad section 1002b. For each keypad section, the arms are located on opposite side of the keypad section. Between the arms in each pair of arms (i.e., each of arms 1004a and 1004b) is provided a cylindrical through-hole for receiving a pin (designated pin 1006, as shown by dashed lines in FIG. 10A) that runs the length of the through-hole. When the keyboard is unfolded, keypad sections 1002a and 1002b each rotate around the pins 1006, while coupler 1008, shown by a side view in FIG. 10B, couples pins 1006 to keep the keypad sections 1002a and 1002b properly aligned during folding and unfolding. Of course, various other variations of hinge mechanisms, such as a single rod with meshed arms, may also be used within the scope of the present invention.

Figure 11:
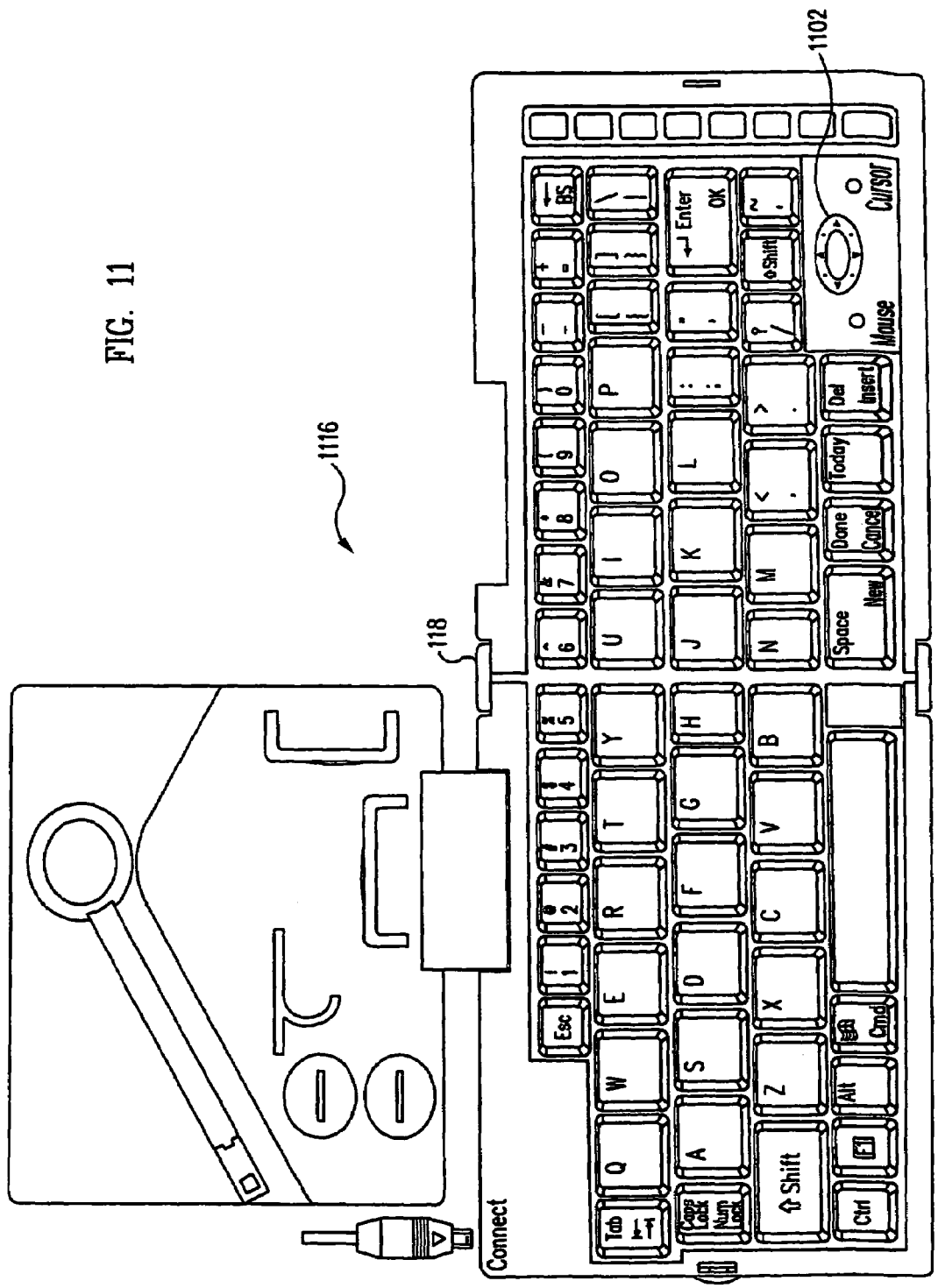
FIG. 11 shows an example a mouse or cursor selector in accordance with an embodiment of the present invention.

According to another embodiment of the present invention, FIG. 11 illustrates keypad 1116 on which are provided mouse and cursor controls 1102. A toggle switch or button is provided to activate alternatively keypad 1116 for cursor and mouse functions.

In one embodiment, the keyboard driver software, including software drivers needed for controlling the mouse or cursor functions are loaded into a mobile device from a compact disk through a desktop or notebook computer. Alternatively, the keyboard driver software can be pre-loaded by the manufacturer of a mobile device. According to one embodiment of the present invention, the driver software can be provided in one or more removal storage devices (e.g., a flash memory card) that can be plugged into a card reader installed on the universal keyboard. In that embodiment, when the universal keyboard first communicates with a mobile device over a wireless, USB or another serial interface, the universal keyboard queries the make and model of the mobile device and downloads from the removable storage device into the mobile device the appropriate software drivers to control the universal keyboard, including the mouse and cursor functions. Using this arrangement, it is not necessary to download the keyboard software from a desktop or notebook computer to the mobile device, using a docking station or cradle of the mobile device.

Figure 12A:
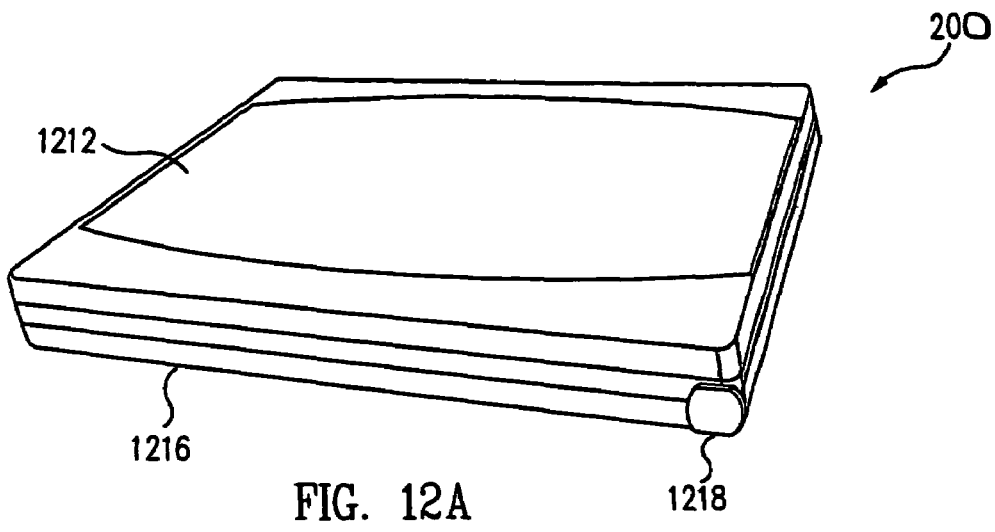
FIGS. 12A-12B show different views of a folded universal keyboard with a top cover in accordance with an embodiment of the present invention.
Figure 12B:
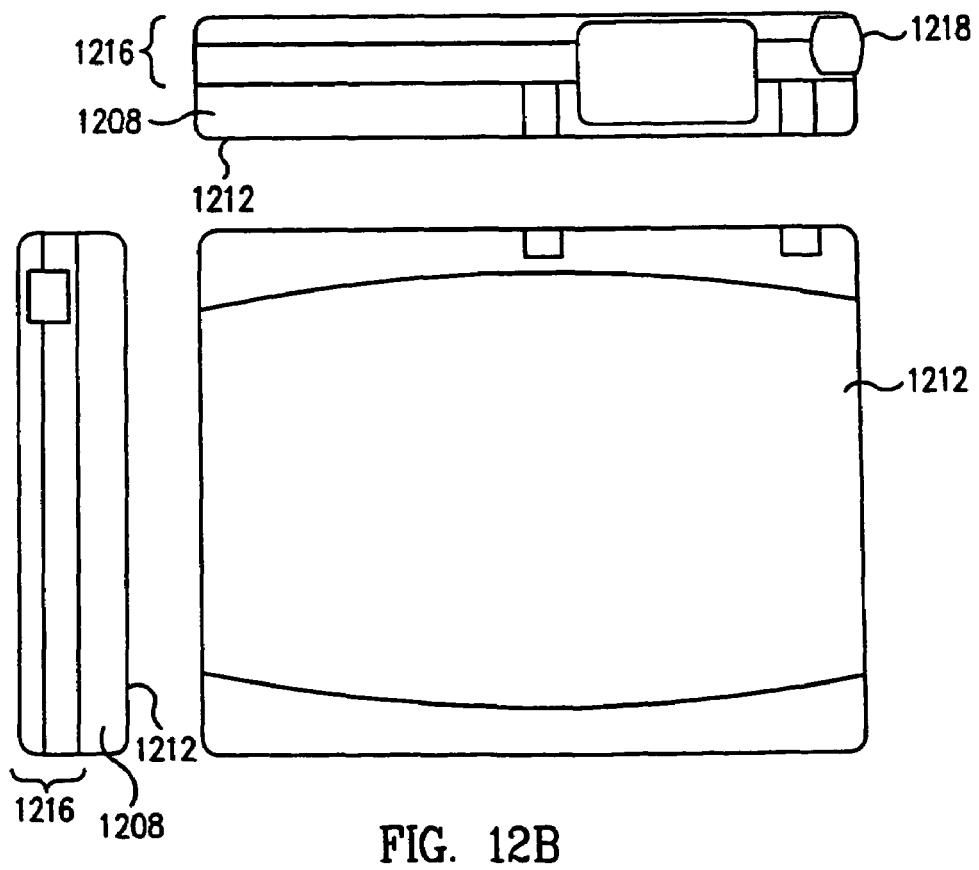

As further shown in FIGS. 1A-1D, top cover 112 may be included with universal keyboard 100 to provide a protective top surface and covering to the folded keyboard. In one embodiment, as shown in FIGS. 12A-12B, top cover 1212 folds over docking structure 1208, folded keypad 1216, and central hinge 1218. As discussed above, the IR head assembly can be mounted to either the inner surface or outer surface of the docking structure, and the top cover may be designed to accommodate either configuration.

Figure 13:
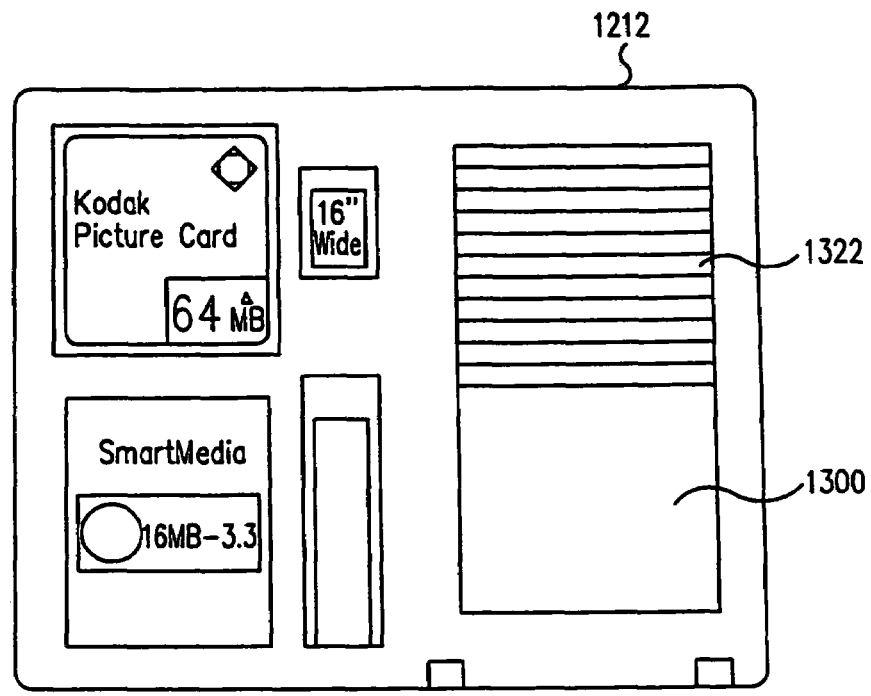
FIG. 13 shows an example of an inside surface of a top cover that is capable of holding various cards and memory devices.

FIG. 13 illustrates inner surface 1300 of top cover 1212, with accommodation of various accessories, according to one embodiment of the present invention. As described above, inner surface of top cover 1212 may include grooves 1322 for holding a stand in place. Furthermore, the inner surface of top cover 1212 may include recesses for accessories, such as memory cards, compact flash (CF) cards, secure digital (SD) cards, multi-media cards (MMC), memory sticks, and PCM-CIA (PC) cards.

As shown in FIGS. 1A-1C, curved arrows A-C indicate the manner in which universal keyboard 100 is folded and unfolded, in accordance with an embodiment of the present invention. To fold universal keyboard 100, section 116a first folds over section 116b, as illustrated by arrow A in FIG. 1A. Then, docking structure 108 and top cover 112 may fold over folded key pad section 116a, as shown by arrows B and C. In order to open or unfold universal keyboard 100, docking structure 108 is first unfolded in the manner indicated by arrow A in FIG. 1B. Then, keypad 116a is unfolded away from keypad section 116a in the manner indicated by arrow B in FIG. 1B. Docking structure 108 may then be pulled away from top cover 112 and set at an inclined angle, as shown by arrow C in FIG. 1C. In other embodiments, docking structure 108 and top cover 112 may be coupled so that docking structure 108 and top cover 112 open and close together, automatically moving with one motion by the user.

Figure 14:
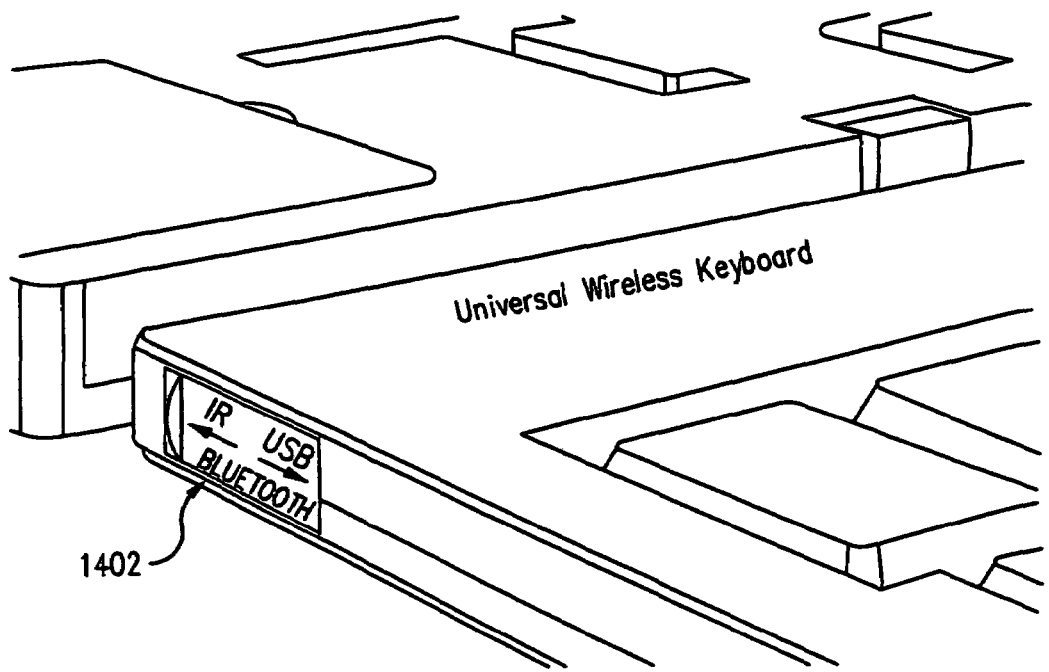
FIG. 14 shows an example of an IR, USB, or Bluetooth™ interface selector in accordance with an embodiment of the present invention.

According to another embodiment of the present invention, the universal keyboard includes not only an IR interface but a universal serial bus (USB) interface and a Bluetooth™ interface. As shown in FIG. 14, a universal keyboard may include interface switch 1402 that controls which interface is active. Interface switch 1402 may be set by a user, or by a sensor sensing whether the universal keyboard is coupled to communicate over the USB or Bluetooth™ interface. Driver software for each mobile device type, brand, and model are loaded into the corresponding mobile device to allow the mobile device to communicate with the universal keyboard.

A USB interface applies well to any tablet PC (FIG. 4) or other products equipped with a host-USB port. In one embodiment, the universal keyboard of the present invention has a built-in USB port for connecting an intelligent USB cable to host-USB equipped products.

Figure 16:
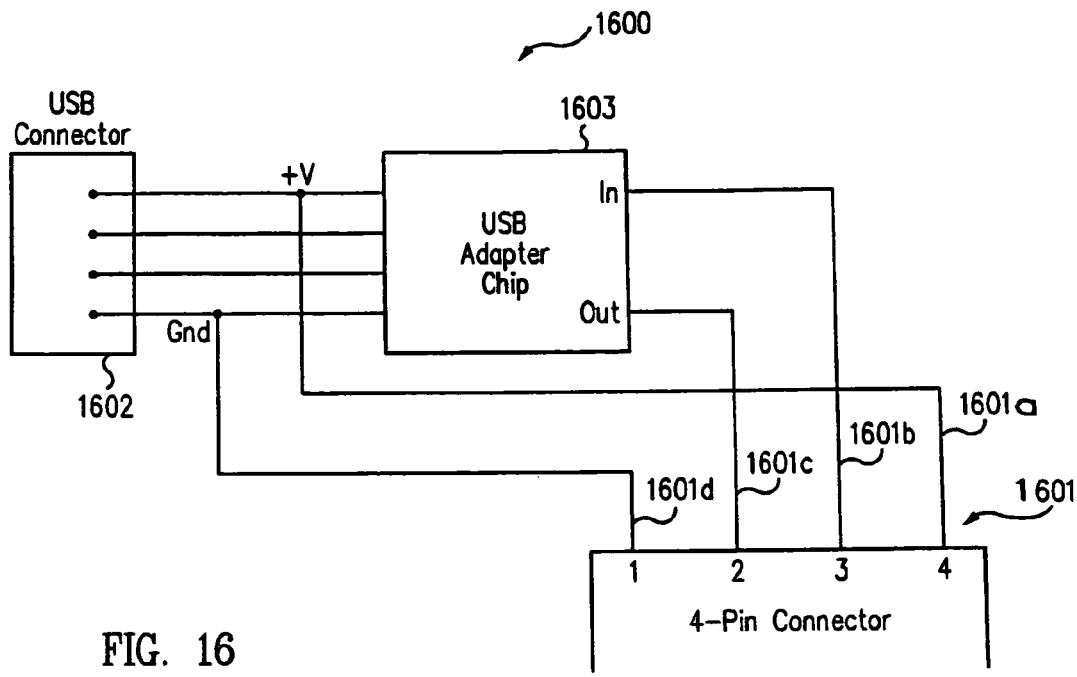
FIG. 16 shows an adaptor for a USB interface, according to one embodiment of the present invention.
Figure 17:
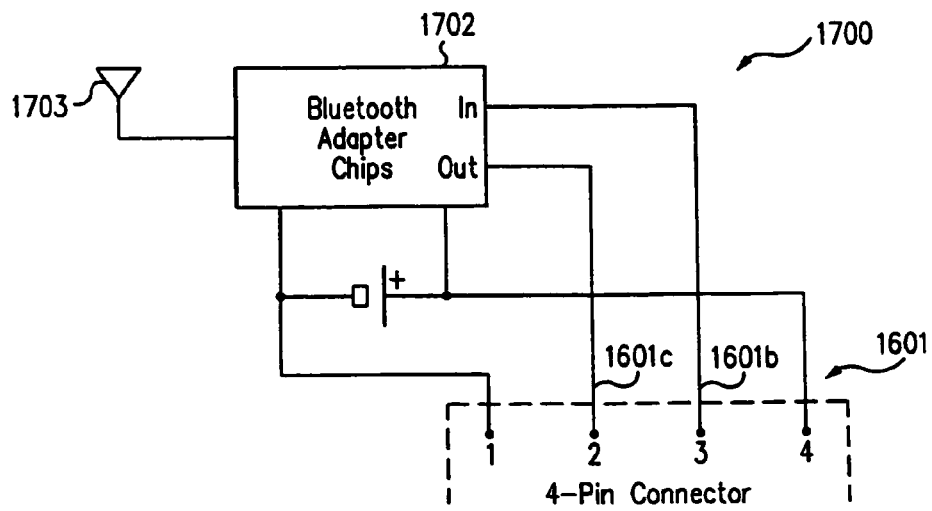
FIG. 17 shows an adaptor for a Bluetooth™ interface, according to one embodiment of the present invention.

Alternatively, the universal keyboard may provide simply 4-pin connector into which a USB adaptor, a Bluetooth™ adaptor, or another adaptor to another industry standard interface may be provided. FIGS. 16 and 17 show respectively an adaptor for a USB interface and an adaptor for a Bluetooth™ interface. As shown in FIG. 16, adaptor 1600 includes serial port connector 1601 for coupling into a corresponding serial port on universal keyboard 100. Serial port 1601 includes power pin 1601a, input pin 1601b, output pin 1601c and ground pin 1601d. In USB adaptor 1600, the power and ground signals are provided as corresponding power and ground signals in USB connector 1602. USB adaptor chip 1603 (e.g., microcontroller integrated circuit MC68HC908JB8) can be programmed to translate between the signals in input pin 1601b and output pin 1601c and the corresponding signals in a USB Human Interface Device (HID). Similarly, as shown in FIG. 17, Bluetooth™ adaptor integrated circuit (e.g., the BlueCore™ integrated circuit from CSR Limited, Cambridge UK) 1702 translates between the signals in input pin 1601b and output pin 1601c and corresponding signals under the Bluetooth™ standard. In FIG. 17, power is provided by a battery in adaptor 1700, and signals over the Bluetooth™ interface is transmitted and received through antenna 1703.

Figure 18:
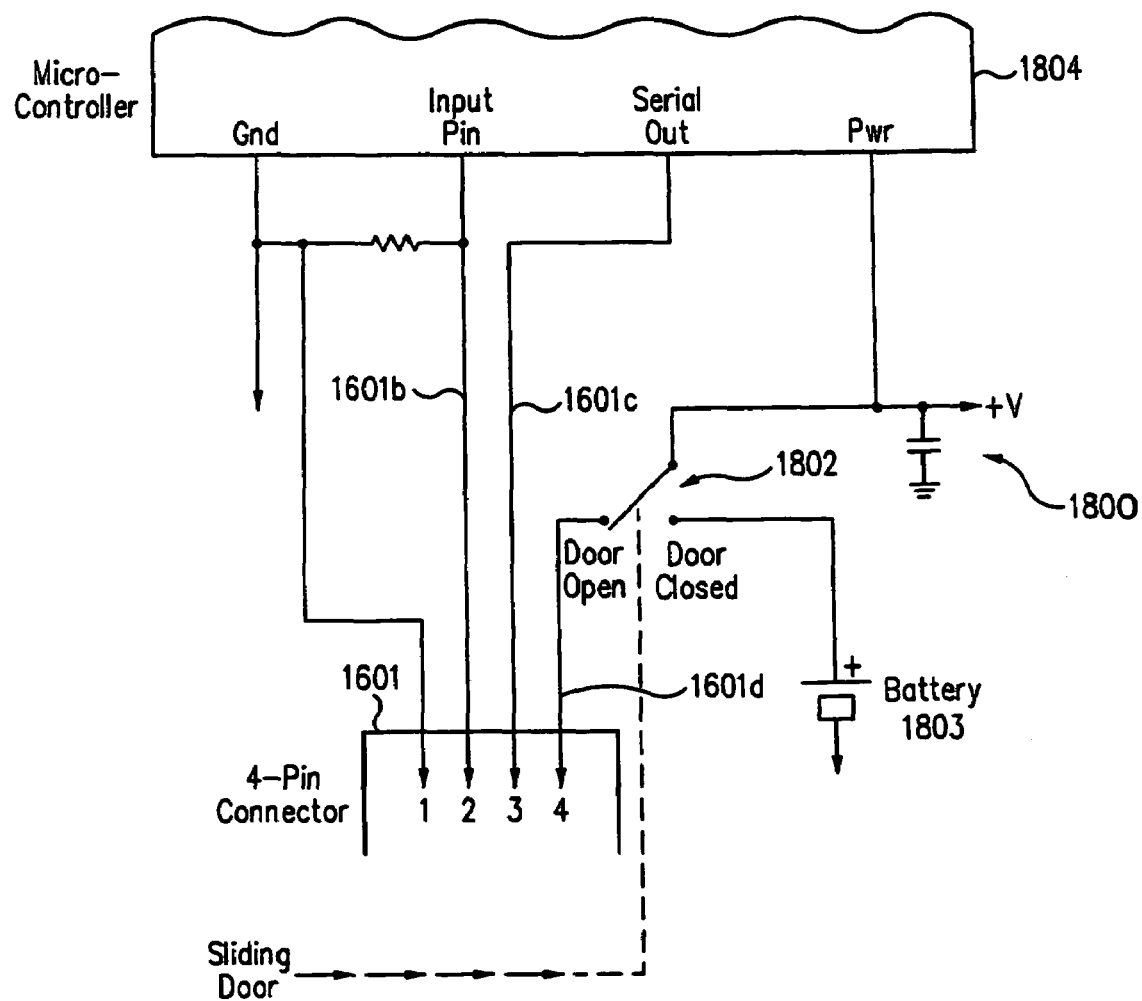
FIG. 18 shows circuit 1800 suitable for implementing switching between battery power (IR interface) and a serial or USB interface.

Unlike PDAs or smart or cellular phones, no driver software is required to operate a tablet PC using a USB interface. Once a cable (e.g., a USB cable) is inserted into the universal keyboard's port (e.g., serial port 1601 described above), a circuitry in the universal keyboard of the present invention automatically senses the inserted cable and turns off electrical current to the IR head, and switches to a serial mode or a USB mode, depending on whether the inserted cable is a serial cable or a USB cable. Under the serial mode or the USB mode, the universal keyboard takes power from the host system (e.g., tablet PC). FIG. 18 shows circuit 1800 suitable for implementing switching between battery power (IR interface) and a serial or USB interface. As shown in FIG. 18, a sensor sensing whether or not a cable is inserted into serial port 1601 controls switch 1802 between a "door open" (i.e., cable inserted, serial or USB port mode) and a "door closed" (i.e., no cable inserted, IR interface mode). When switch 1802 is in a "door open" position, power to microcontroller 1804 (i.e., the controller for universal keyboard 100) is provided by power pin 1601d from the external device. When switch 1802 is in the "door closed" position, power to microcontroller 1804 is provided by internal battery 1803.

Alternatively, in one embodiment, to select the IR interface, the user places a switch in the "IR" position. In that position, the switch physically obstructs the USB port. Alternatively, when the switch is placed in the "USB" or "serial" port position, the USB serial port is activated. Such an interface switch prevents the IR port and the USB or serial port to be simultaneously activated. Prevention of simultaneous activation of the IR and USB ports is desirable because, when the IR port is selected, the battery in the keyboard is in the active discharging mode. At the same time, if the USB or serial port is also active, the power from the USB host system force-charges the keyboard battery, and hence causing a possible hazard.

The Bluetooth™ interface can be provided in any PDA, smart or cellular phone, tablet PC, or other mobile product equipped with Bluetooth™ capability, either embedded or externally attached through an adapter or memory card, in one example. When a Bluetooth™ module is plugged into the USB port of the universal keyboard, the keyboard circuitry automatically senses the Bluetooth™ module and turns off electrical current to the IR head and switches to the Bluetooth™ module, according with one embodiment of the present invention.

Figure 15:
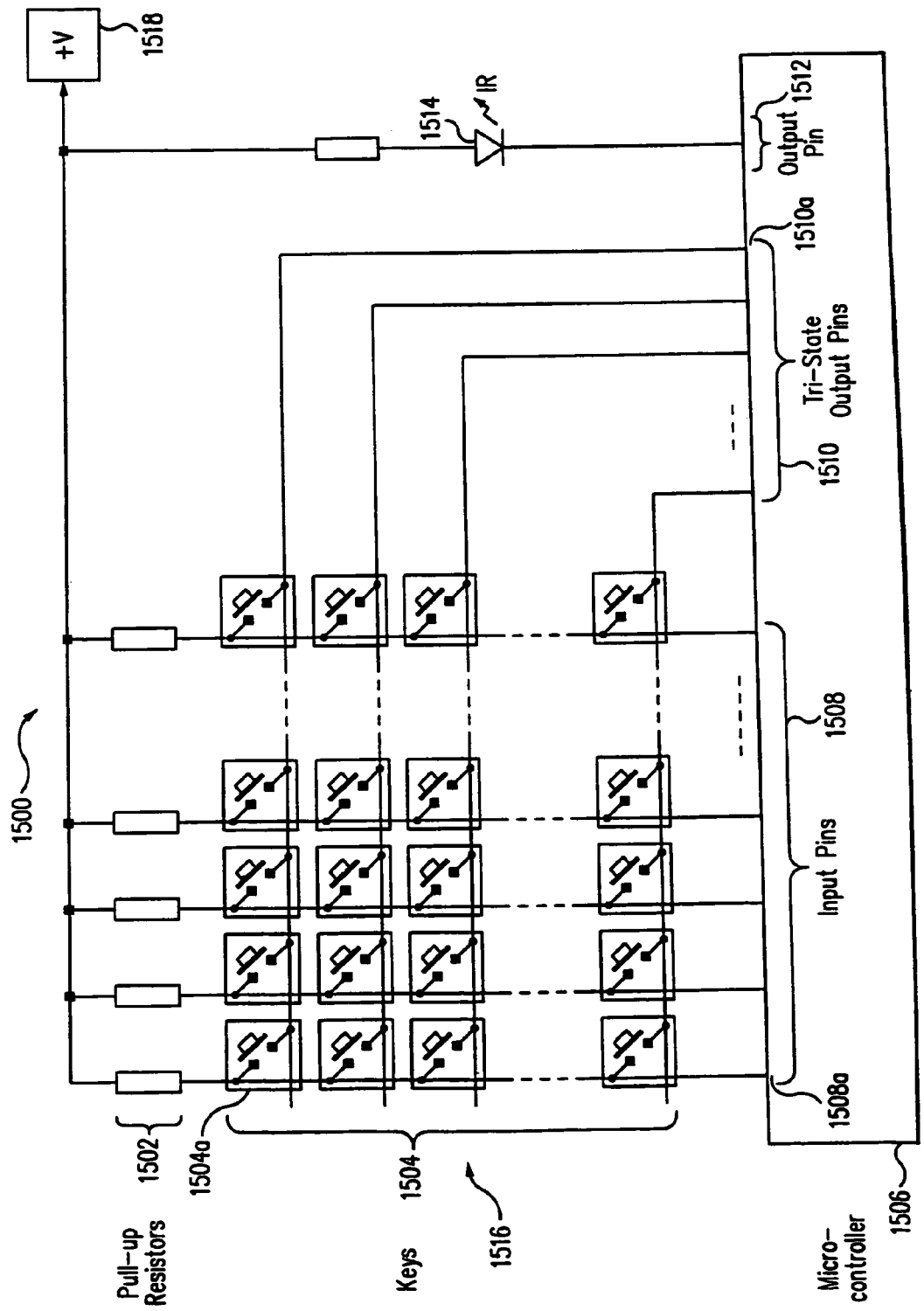
FIG. 15 shows an example of a universal keyboard circuit diagram in accordance with an embodiment of the present invention.

In accordance with another embodiment of the present invention, a method for low-power scanning a keyboard is provided utilizing an example of a keyboard circuit shown in FIG. 15. In one embodiment, micro-controller 1506 controls keypad 1516 of universal keyboard 1500 using input pins 1508 (usually 8) to micro-controller 1506 and output pins 1510 (usually 10 to 19) from micro-controller 1506. Output pin 1512 from micro-controller 1506 is also connected to an infrared light emitting diode (IR LED) 1514, which transmits data to a mobile device through IR radiation. According to the present invention, an appropriate low-power micro-controller (e.g., a 3-volt micro-controller) is chosen to control universal keyboard 1500.

Keypad 1516 of universal keyboard 1500 includes keys 1504, each of which is electrically connected to one of input pins 1508 and one of output pins 1510. Thus, when a user depresses a key, one of the input pins is shorted to one of the output pins. For example, when a user depresses key 1504a, input pin 1508a and output pin 1510a are shorted. This short circuit can be sensed by applying a known voltage briefly and successively on the output pins one at a time, and then sensing the voltage at each of the input pin successively while the voltage is being applied to the output pin. This process for detecting the depressed key is termed "keyboard scanning." In the embodiment shown in FIG. 15, each of input pins 1508 is connected to a power supply 1518 through individual pull-up resistors 1502. Thus, in the absence of an applied voltage on the output pins, input pins 1508 are pulled up to the power supply voltage level, or "high" level. In the prior art, such pull-up resistors are usually in the tens of kilo-ohms range, so that a few tenths milliampere of current flow through the pull-up resistor when a connected output pin is driven to a "low" level. In the prior art, the pull-up resistor value cannot be increased because stray capacitances in the wires that connect to the keys are of the order of hundreds of picofarads. A higher resistor value would result in an unacceptably large RC time constant. The RC time constant limits how quickly an input pin can return to the high level ready for detecting the next depressed key.

According to the present invention, the firmware of microcontroller 1506 "scans" the keyboard device of universal keyboard 1500 by first driving one of the output pins 1510 to the ground or "low" level, while leaving all other output pins 1510 in a high impedance state. When a short circuit is created due to a depressed key, the input pin corresponding to the depressed key is pulled to a low level by a low voltage on the output pin corresponding to that depressed key.

The firmware of prior art keyboards scan the keyboard at fixed time intervals (e.g., once every 10 to 40 milliseconds). Because of the low resistance in the pull-up resistors, each scan consumes a considerable amount of energy. The longer the scanning interval (i.e., the less frequent the keyboard is scanned), the less energy is used on the average. However, the scanning interval must be short enough to maintain responsiveness to the user's typing. Otherwise, the scanning mechanism may miss some of the keys depressed by a fast typist.

According to one embodiment of the present invention, rather than using a fixed scanning interval, an adaptive scanning interval is used. The scanning interval according to the present invention is determined by the frequency in which keys 1504 are depressed and released. When keys 1504 are depressed and released quickly, the firmware shortens its scanning interval so that it does not miss any user action. When the firmware senses that keys 1504 are depressed and released less frequently, it lengthens the scanning interval to conserve energy.

In accordance with another embodiment of the present invention, the value of pull-up resistors 1502 is increased above 100 kilo-ohms, preferably in the multiple mega-ohms range (e.g., 1 to 100 mega-ohms), thereby reducing the current consumption during scanning from tenths of milliamperes to microamperes. A slow recovery time is avoided by a special step in the scanning process. Each time a depressed key is detected, and before the corresponding output pin is put back into a high impedance state, the output pin is momentarily driven high to recharge the stray capacitance of the wire. The slow recharge through the large pull-up resistor is therefore avoided. Thus, even though a much larger pull-up resistor value than that in the prior art is used, the universal keyboard of the present invention does not result in a keyboard with slower responsiveness.

Accordingly, the low-power keyboard scanning method in accordance with the present invention is more energy efficient than prior art keyboards. The low-power keyboard scanning method of the present invention allows keyboards of the present invention to use two low-cost CR2032 coin batteries for up to six months under a typical usage of two hours of continuous typing per day. Prior art keyboards required batteries that are capable of a higher electrical current and a higher energy capacity.

The above-described embodiments of the present invention are merely meant to be illustrative and not limiting. Various changes and modifications may be made within the scope of this invention. Therefore, the appended claims encompass all such changes and modifications.

What is claimed is:

1. A universal keyboard, comprising:
   a docking structure for accommodating a mobile device;
   an arm having a first end mounted on the docking structure at one end by a connector, and having a second freely movable end, such that the second freely movable end of the arm traces an arc centered about the connector over a predetermined range of angles;
   an infrared (IR) head mounted on the freely movable end of the arm for transmitting data over a wireless link;
   a keypad that is physically coupled to the docking structure, and providing electrical signals representing the keys on the keypad that are depressed by an external agent; and
   a controller circuit receiving the electrical signals and converting the electrical signals into data for transmission by the IR head over the wireless link.

2. The universal keyboard of claim 1, wherein the IR head includes an IR light emitting diode (LED).

3. The universal keyboard of claim 1, wherein the IR head is powered by a battery.

4. The universal keyboard of claim 3, wherein the battery is a coin battery.

5. The universal keyboard of claim 1, wherein the connector engages the arm to allow the arm to rotate about an axis perpendicular to the docking structure.

6. The universal keyboard of claim 1, wherein the connector comprises a ball and socket device.

7. The universal keyboard of claim 1, wherein the connector comprises a rotatable member.

8. The universal keyboard of claim 1, wherein the connector comprises a hinge mechanism.

9. The universal keyboard of claim 5, wherein the connector includes a circular multi-hub copper contact structure.

10. The universal keyboard of claim 1, wherein the connector is mounted on a surface of the docking structure on the outside of the universal keyboard in a folded configuration.

11. The universal keyboard of claim 1, wherein the connector is mounted on a surface of the docking structure on the inside of the universal keyboard in a folded configuration.

12. The universal keyboard of claim 1, further comprising movable holders mounted on the docking structure to accommodate any of a plurality of mobile devices.

13. The universal keyboard of claim 12, wherein one or more of the holders are provided a spring-loaded mechanism for securing the mobile device.

14. The universal keyboard of claim 1, wherein the keypad comprises a plurality of keypad sections, wherein two of the sections are held together by a hinge, allowing the sections held to fold and unfold cooperatively.

15. The universal keyboard of claim 11, wherein the hinge comprises plates having engaged gear-like teeth that mesh during the folding and unfolding of the keypad sections.

16. The universal keyboard of claim 15, wherein plates are coupled by a face plate.

17. The universal keyboard of claim 14, wherein the keypad further comprises a latch for locking the two sections of the keypad into a predetermined position.

18. The universal keyboard of claim 1, wherein the keypad further comprises controls for operating a mouse.

19. The universal keyboard of claim 1, wherein the keypad further comprises controls for operating a cursor.

20. The universal keyboard of claim 1, further comprising a cover that folds over the docking structure in a folded position of the keyboard.

21. The universal keyboard of claim 20, wherein recesses are provided on the inside surface of the top cover to accommodate a removable storage device.

22. The universal keyboard of claim 1, further comprising a foldable stand for supporting the docking structure when the universal keyboard is in an unfolded position.

23. The universal keyboard of claim 22, further comprising grooves provided on a surface of the docking structure, each groove being provided for fixing the docking structure in a predetermined position.

24. The universal keyboard of claim 22, further comprising a protective cover that folds over the docking structure in a folded position of the keyboard, the protective cover having a plurality of grooves provided on one surface, wherein, in an unfolded position of the keyboard, the grooves are exposed to accommodate the stand, so as to support the docking structure in any one of a plurality of predetermined positions.

25. The universal keyboard of claim 1, further comprising:
   a protective cover that folds over the docking structure in a folded position of the keyboard; and
   a connecting structure coupling the protective cover and the docking structure, the connecting structure placing both the protective cover and the docking structure into a predetermined configuration simultaneously as the universal keyboard is unfolded.

* * * * *